US007156999B2

(12) United States Patent
Blais et al.

(10) Patent No.: US 7,156,999 B2
(45) Date of Patent: Jan. 2, 2007

(54) METHODS AND APPARATUS FOR TREATING ANIMAL MANURE

(75) Inventors: Jean-François Blais, Beauport (CA); Guy Mercier, Quebec (CA); Geneviève Bélanger, Bernieres (CA); Myriam Chartier, Quebec (CA); Danielle Leblanc, Beauport (CA)

(73) Assignee: Institut National de la Recherche Scientifique, Quebec (CA)

( * ) Notice: Subject to any disclaimer, the term of this patent is extended or adjusted under 35 U.S.C. 154(b) by 338 days.

(21) Appl. No.: 10/465,964

(22) PCT Filed: Apr. 8, 2003

(86) PCT No.: PCT/CA03/00535

§ 371 (c)(1),
(2), (4) Date: Jun. 27, 2003

(87) PCT Pub. No.: WO03/086977

PCT Pub. Date: Oct. 23, 2003

(65) Prior Publication Data
US 2005/0000906 A1 Jan. 6, 2005

(30) Foreign Application Priority Data
Apr. 9, 2002 (CA) ................... 2380797

(51) Int. Cl.
*C02F 1/24* (2006.01)
*C02F 3/28* (2006.01)
*C02F 9/14* (2006.01)
*C02F 11/04* (2006.01)

(52) U.S. Cl. .............. 210/608; 210/705; 210/707; 210/734; 210/804

(58) Field of Classification Search ........... 210/608, 210/705, 707, 734, 804
See application file for complete search history.

(56) References Cited

U.S. PATENT DOCUMENTS 2,975,122 A * 3/1961 Laboon ............... 210/608

(Continued)

FOREIGN PATENT DOCUMENTS

CA 1091830 12/1980

(Continued)

*Primary Examiner*—Thomas M. Lithgow
(74) *Attorney, Agent, or Firm*—Patterson, Thuente, Skaar & Christensen, P.A.

(57) ABSTRACT

A method of treating animal manure yielding a final liquid fraction and solid fractions whereby the final liquid fraction has a suspended solids (SS) content of about 3 g/L or lower comprising subjecting at least a part of said manure to a first biological passive flotation step in a flotation unit having a hydraulic residency time (HRT) of about 4 to about 24 hours with a polymer to yield a first flotation solid fraction and a first flotation liquid fraction, said method comprising a further treatment. An apparatus for treating animal manure comprising a main flotation unit having a HRT of about 4 to about 24 hours, said main flotation units including skimming means for removing floating solids from at least a portion of the surface of the manure and dredging means for removing settled contaminants from at least a portion of the bottom of the tank, whereby at least a part of said manure is directed to the main flotation unit wherein it is separated in a first floating solids fraction, a second liquid fraction and a first settled solids fraction and wherein the second liquid fraction has a SS content of about 3 g/L or lower.

15 Claims, 1 Drawing Sheet

U.S. PATENT DOCUMENTS

| | | | |
|---|---|---|---|
| 3,788,478 A * | 1/1974 | Savage | 210/197 |
| 4,069,149 A | 1/1978 | Jackson | |
| 4,334,997 A * | 6/1982 | Peterson | 210/603 |
| 4,401,565 A * | 8/1983 | Schimel | 210/258 |
| 4,596,658 A * | 6/1986 | Mandt | 210/626 |
| 4,671,881 A | 6/1987 | Itoh | |
| 5,015,384 A * | 5/1991 | Burke | 210/603 |
| 5,310,485 A * | 5/1994 | Roshanravan | 210/603 |
| 5,437,785 A | 8/1995 | Roshanravan | |
| 5,540,836 A | 7/1996 | Coyne | |
| 5,545,325 A * | 8/1996 | Hsu et al. | 210/605 |
| 5,660,718 A | 8/1997 | Chudacek et al. | |
| 6,245,121 B1 | 6/2001 | Lamy et al. | |

FOREIGN PATENT DOCUMENTS

| | | |
|---|---|---|
| EP | 0 498 337 A | 8/1992 |
| FR | 2 194 655 A | 3/1974 |
| WO | WO 95 21140 A | 8/1995 |

* cited by examiner

METHODS AND APPARATUS FOR TREATING ANIMAL MANURE

FIELD OF THE INVENTION

The present invention relates to methods and apparatus for treating animal manure. More specifically, the present invention is concerned with methods and apparatus for treating animal manure comprising a mechanical and/or hydraulic solid-liquid separation step or units, respectively.

BACKGROUND OF THE INVENTION

In large piggeries, swine breeding is conducted in three stages, each taking place in a separate area. 1) piglets are first in the pig breeding shed where they stay with their mothers for about 14 days after their birth; 2) the piglets are then transferred to pig nursery pen; and 3) they are then transferred to the feeder barn for the last phase of breeding before slaughter. These three stages each require specific feed and produce specific manure. A pig produces an average of 7.6 L of manure per day which amounts in Canada only to about 30 millions m$^3$ produced annually. Many problems are associated with manure production. A fraction of the manure produced may be used in land spreading for agricultural purposes but the soil's phosphorus saturation level is quickly reached and the surplus then trickles to surrounding surface waterways and underground water reserves. Air pollution results from odors produced by anaerobic fermentation in manure pits. Manure have average contents of 19.8 g/L BOD$_5$, 52.4 g/L COD, 6.1 g/L total nitrogen and 1.9 g/L total phosphorus (P$_t$) (MAPAQ, 1986). The manure may also contain heavy metals such as copper and zinc that are present in the pig feed which therefore also end-up in the environment. Various methods have been devised for manure disposal or transformation.

In the province of Quebec, Canada, land spreading constitutes the technique most widely used for manure disposal. Most other known techniques may be classified in one of the following categories: 1) mechanical separation; 2) aerobic treatment (with or without nitrification and denitrification); 3) anaerobic treatment; 4) composting; 5) filtration, osmosis and ultrafiltration processes; 6) drying and fertilizers production; 7) biological treatment; and 8) flotation processes.

Mechanical Separation

Grisé (2000) describes in U.S. Pat. No. 6,033,570 a method comprising using a screw press to separate the solids of the manure after an addition of cellulose (vegetal) based product, followed by a treatment of the yielded liquid on biological filters. SLS Technologies uses a method based on centrifugation (FPPQ, 2001). Miknevich and Hassick, 1998 describe in U.S. Pat. No. 5,776,350 a method comprising, after an addition of polyacrilamides, filtering the manure in a mechanical separator having screens. The Solution Biofertile™ process uses a screen and a screw press as a first step of a more complex process comprising further treating the liquid so produced (FPPQ, 2001).

Aerobic Treatment with or without Nitrification and Denitrification

Marr (1968) describes a mesophilic aerobic treatment of the liquid fraction of the manure wherein temperatures of 7 to 37° C. are easily maintained by the microbiological activity. A further sanitization with composting or limestone treatment may be required since operating temperatures may not always be sufficiently high to eliminate pathogens (Degrémont, 1989; EPA, 1979).

Vallée et al., (1989) describes a method performed in St-Elzéar in the province of Québec comprising a first step of screening the solid fraction, followed by an anaerobic treatment of the liquid fraction in bioreactors, and a final polishing of the liquid fraction in aeration lagoons. The resulting water is used for irrigation of plots cultivated in forage corn. The recovered solid fraction amounts to about 25% of the raw manure and reduced the COD by 61%, the total solids by 83% and the total phosphorus (P$_t$) by 87%. The mesophilic aerobic treatment of the liquid in bioreactors required a minimum hydraulic retention time (HRT) of ten days achieving thereby a decrease of 84% of the COD, of 64% of the NH$_4$, and of 56% of the P$_t$ as compared to that existing In the bioreactor feed. The final lagooning is particularly efficient for the reduction of COD$_5$ and the reduction of suspended solids (SS) which are of 97% and 88%, respectively, as compared to the concentration in the bioreactor effluent. An analysis of this method's operating costs in farms of 10,000, 20,000 and 50,000-head swine operation concluded that it would amount to an annual cost of between $13CAD to $9CAD per pig (Vallée et al., 1989; Gariépy et al., 1989; Cayer, 1989). This type of method is disadvantageously complex and costly.

Many methods are currently used in Europe comprising either removal of nitrogen or the recovery of nitrogen, phosphorus and potassium. They comprise drying and centrifugating the solid fraction and applying biological mechanisms of nitrification-denitrification to the liquid phase. The main methods and manufacturers are Agroclar™, Denitral™, OTV™. Technipompe™, Technolyse™, Val-Epurer™. For instance, the French method Agroclar is an aerobic biological method comprising a solid-liquid phase separation, aeration of the liquid phase and sludge concentration. It may remove up to 95% of the nitrogen and up to 70% of the phosphorus originally contained in the sludge. This process allegedly Costs about $10CAD/m$^3$ when conducted in a centralized unit. These methods are not applicable to manure management in medium size farms because of their costs and complexity.

Kolber (2001) describes in U.S. Pat. No. 6,190,566 a method comprising a nitrification-denitrification treatment followed by a solid-liquid separation and a drying step of solids on drying beds. Teran et al. (2000) describes in U.S. Pat. No. 6,039,874 an aerobic method operated in lagoons after a first solid separation. Envirograin's Solution Biofertile™ first screens the manure and then treats the liquid portion aerobically and cold dries the separated solids in a centralized plant. This method would cost about 5 to $10CAD/m$^3$ (FPPQ, 2001). CRIQ's Blosor Lisier™ method comprises decanting of the manure with concomitant sludges drawing, sand filtrating the supernatant, aerobic biofiltrating the filtered supernatant on an organic substrate (peat, compost, chips and barks), polishing the first biofilter's effluent oil mixed substrate and optionally, anaerobic digesting the decanted sludges. The Biosor Lisier™ method would cost about $10CAD to $15CAD/m$^3$ (FPPQ, 2001).

Marr (1968) describes a method comprising biological aerobic thermophilic treatment ensured by microorganisms requiring a temperature of 55° C. This method ensures an increased oxidation of organic matter, a reduction in oxygen need and an increased stability of the system against chocks (Matsch and Drnevich, 1977). Under optimal conditions, two to three days of residence in the reactor are sufficient to oxidize organic matter (IAF, 1985; Bisaillon et al., 1984). Shooner and Samson (1996) describe a raw manure treatment performed in a reactor having thermophilic autothermal conditions. After strong aeration for a residence time varying between 5 to 15 days, a substantial reduction of COD, of BOD and of pathogenic microorganisms and an odors removal was achieved.

Anaerobic Treatment

Anaerobic treatment based methods seek to degrade organic matter in the absence of oxygen so as to promote gas (methane) formation which may then serve as an energy source for the farm. Bioscan's Biorek™ technology (FPPQ, 2001) and the German corporation Schwarting Umwelt Gmbh apply this method (Schwarting, 2002). McElvaney (2001) also described such a method in U.S. Pat. No. 6,254,775.

Composting

This solid phase fermentation process involves microorganism growth in a solid phase acting as substrate or support in the absence of water flow. Composting produces a significant release of heat and the temperature evolution follows three phases: a mesophilic phase (30–40° C.), a thermophilic phase with temperatures that may reach 70° C. and a cooling and maturation phase wherein the compost decreases to surrounding temperature. Temperatures of 60–65° C. are desirably maintained to achieve hygienization (i.e. microorganism destruction along with an active humidification without compost cooking (Mustin, 1987)). For manure composting, an optimal carbone/nitrogen ratio should be respected, namely between 25 and 35 (BNQ norms recommends a maximum of 25). Compost produces an odorless humus having a good fertilizing value: $1.11CAD/kg for nitrogen, $0.53CAD/kg for $K_2O$, $0.95CAD/kg for $P_2O_5$. The volume reduction achieved by composting facilitates its exportation and spreading which would have been more difficult with raw manure (Texier, 1996; Ménart, 1996).

Texier (1996) describes composting methods performed in centralized units or on the farm. A starch based binding agent (Prolis™) is mixed with manure so as to increase its adhesion to straw. Composting at the farm with this method costs about $17CAD/m$^3$. About 41% of this cost appears to be attributable to the starch based agent's cost. UQAR produced good results with maple and aspen chips and bark, whereas resinous residues were proved unsuccessful (Maheux et al., 1996). Composting according to the UQAR method coots about $12CAD/m$^3$ for a large farm (11,000 m$^3$ of manure annually). Giving out compost at the plant's door could decrease the cost to close to $8CAD/m$^3$ and its sale would further reduce its cost. This approach is however limited by the lack of availability of maple or aspen residues in certain areas. Biomax's Compost Air™ technology, Meunerie J. B. Dionne and Fils' Eco-compost™ technology and Global Earth Products Inc.'s Marvel-Total™ Management System technology also use composting. The Eco-Compost™ and the Compost Air™ technologies allegedly cost about $5CAD to $10CAD/m$^3$.

Filtration, Osmosis and Ultrafiltration Processes

Bilstad et al. (1992) describes a reverse osmosis process recovering 95% of nitrogen present in a liquid phase separated from manure. Tétrault and Grandbois (1999) in U.S. Pat. No. 5,885,461 describe a process used by Purin Pur™ comprising an ultrafiltration and two osmosis phases after a mechanical solid separation.

Drying and Fertilizer Production

Cloutier (1996) describes a method in which manure adsorbed on polymer pellets recovered from oil refineries is transformed in fertilizers and humus with equipment from Hydro-Québec and BN Métal. Legros (1998) describes a method of treating manure comprising drying it in a centralized plant. The fertilizer so produced would be rich in nitrates and phosphates, easy to transport, to spread and odorless. The application of this method by the Atrium corporation necessitates a 16 millions expenditure for the construction of a centralized plant.

Biological Treatments

A number of studies were performed on partial or complete microbiological treatment of pig manure. They teach means to eliminate manure odors at its root. Jolicoeur and Morin (1987) and Ralnville and Morin (1986) describe the use of *Acinetobacter calcoaceticus* spread on the piggery floor to degrade volatile fatty acids generating the odours (Bourque et al., 1987). Pabai et al. (1996) report that a number of studies seek to isolate microorganisms that produce lipase enzymes able to degrade there fatty acids. Other described treatments include lagooning along with algae (*Chlorella*) and cyanobacteria (*Scenedesmus*) production (de la Noüe et al., 1994); aerobic fixed bed along with aquatic plants (*Salivinia molesta*) (Yang and Chen, 1994); and stabilizing with strong aeration followed by cyanobacteria growth (*Spirulina maxima*) (Canizares and Domiguez, 1993). Methods for conferring commercial value to manure have been described including algae or aquatic plant (*Phragmites* sp) production (Cooper and Findlater, 1990), volatile fatty acid production by *clostridium* (*Clostridium acetobutylicum, Clostridium butyricum*) (Marx et al., 1990); 5-aminolevullnic acid herbicide production by *Rhodobacter sphaeroides* (Sasaki at al., 1990); production of biofertilizer having an antibiotic action with *Streptomyces albidoglavus* (Hayashida et al., 1988). Cooper and Findleter (1990) also describe the use of *Phragmites* sp to purify the liquid portion previously cleaned of its solid particles. This latter method is used for polishing effluents in more than 35 countries having tropical, semi-dry, hot-dry climates (Mandi et al., 1996), and Mediterranean, tempered and sub-polar climates (250 facilities in northern countries such as Denmark, Sweden, Finland and Norway). Such facilities have been used for 25 years in Germany and remain very efficient. This method works throughout the year including during the winter and MENVIQ described its effectiveness in treating wastewater (Bordeleau, 1993).

Flotation

Flotation has been used in a number of methods for treating wastewater. Jackson (1978) describes in U.S. Pat. No. 4,069,149 a wastewater treatment comprising separating solids from the bulk of the liquid by a gaseous flotation process, using the dissolved gas in the liquid as the source of gaseous bubbles for flotation purposes. Chudacek et al. (1997) describes in U.S. Pat. No. 5,660,718 a method for removing solid particles from liquids involving flotation with jet injecting air. Ramirez and Johnson (1980) describe in CA 1,091,830 and Coyne (1996) describe in U.S. Pat. No. 5,540,836 flotation methods involving external source of air. Itoh (1987) describes in U.S. Pat. No. 4,671,881 the use of pulverized coal and air to promote flotation. Roshenravan (1995) describes in U.S. Pat. No. 5,437,785 a method comprising an anaerobic digester, a free standing tank and a flotation cell. The gas produced during the anaerobic digestion is then compressed in the tank. The gas mixed with water is then directed from the tank to the flotation cell to assist the flotation. None of these references suggest using these methods to treat manure and they all use an added or compressed gas for their operation (methane, air or a mixture of air and other gases).

Few of the above-described methods are appropriate for use in medium size farms, namely the 2000-head swine operations. The treatment at the farm including disposal of the effluent in the environment presently requires important investments from the producers. Although it would finance a fraction of the method's installation and operation costs, the above methods do not include waste reclamation of the various products yielded.

There thus remains a need for a method of treating manure for medium size farms that avoid the drawbacks of the methods of the prior art.

SUMMARY OF THE INVENTION

Manure treatment by the method of the present Invention is advantageously simple and inexpensive comparatively to methods of the prior art. Estimated costs for the present method are around $6CAD/m$^3$ for a farm of 2000-head swine producing 4000 m$^3$ of manure annually. Its operating costs may be greatly reduced and even eliminated by commercializing solids yielded during the treatment (natural fertilizer, etc.). The equipment used to work the present invention are simple to operate and their maintenance requirements are minimal, making the method of the present invention particularly advantageous for small and medium size piggeries. Once the equipment is installed, it may be operated by the farm staff itself. Technical support may be necessary In case of difficulties. The method of the present invention may also advantageously use the farms' existing infrastructures thereby keeping the costs low. Furthermore, the method of the present invention may produce a liquid fraction sufficiently clean to be suitable for irrigation of agricultural soils saturated with phosphorus.

Generally, the methods and apparatus of the present invention produce a liquid that advantageously has a $NH_4/P_t$ ratio>7. This ratio satisfies good practice directives formulated by an agriculture research and development Quebec governmental organism. This ratio may not been reached when the initial manure suspended solid (SS) and $NH_4^+$ and $P_t$ contents are very low. In those cases, the final liquid fraction produced is obviously also proper for irrigation purposes and satisfies the ends targeted by the present invention.

The methods and apparatus of the present Invention may also remove a substantial amount of the total phosphorus ($P_t$) initially contained in the raw manure, namely according to specific embodiments presented herein, between about 31.5 to about 85.9% of the initial concentration of $P_t$ from the liquid fraction.

These methods and apparatus may also advantageously remove from the yielded liquid fraction a substantial amount of the suspended solids (SS) initially contained in the raw manure, namely according to specific embodiments presented herein, between about 65 and about 97.2% of and achieve a final SS concentration of about 0.1 to about 3 g/L. The low solid content of the liquid fraction produced with the methods and apparatus of the present invention also advantageously reduces odors and reduces pipes clogging during spreading.

The volume of solids resulting from the application of these methods and apparatus may reach 12.4% of the volume and is generally around 20–25% of the raw manure.

The methods and apparatus of the present invention may be used to treat all types of animal manure by selected the appropriate polymer, reaction time, manure age, etc. Hence, the methods and apparatus of the present invention were demonstrated to be efficient to treat manure from nursery pigs, feeder pigs, and farrowing pigs.

As used herein, the term "solid-liquid separation step" is meant to refer herein to any known solid-liquid separation and includes flotation, centrifugation, decantation, filtration (for particles equal to or smaller than about 45 μm), screening (for particles larger than about 45 μm) including drum screens, gravity tables, etc.

The methods of the present invention comprise at least one biological passive flotation and one further treatment selected from the group consisting of a coarse solid particles separation treatment for removing solid particles larger than about 0.05 mm prior to the first flotation, and a solid-liquid separation step following the first biological flotation. This solid-liquid separation step may be any of a number of treatments as defined herein. Optimal results are obtained when this separation step is a second flotation step. Example 7 herein shows that acceptable results can also be obtained with an other solid-liquid separation step such as a decantation. Hence, it is believed that manure subjected a first flotation and a further treatment as described above could be sufficient to obtain a liquid fraction having a final SS concentration of about 0.1 to about 3 g/L. Hence, it is apparent from Examples 1 to 7 for instance, that this target is reached when the manure is subjected to one flotation and a further treatment to remove coarse solid particles. Note that the screening used in addition to the decantation in the 23 L flotation unit in certain examples is solely used to avoid clogging of the system and can be omitted: acceptable results are obtained with only a decantation step as is apparent from results presented herein.

The coarse solid particles separation treatment may be performed by a number of coarse solid particles separation means known to a person of ordinary skill in the art including centrifugation, decantation, filtration (for particles equal to or smaller than about 45 μm), screening (for particles larger than about 45 μm) including drum screens, gravity tables, etc.

The second biological passive flotation is used to remove colloids that may not have been completely removed during the first flotation.

More specifically, in accordance with the present invention, there is provided a method of treating animal manure yielding a final liquid fraction and solid fractions whereby the final liquid fraction has a suspended solids (SS) content of about 3 g/L or lower comprising: subjecting at least a part of the manure to a first biological passive flotation step in a flotation unit having a hydraulic residency time (HRT) of about 4 to about 24 hours with a polymer to yield a first flotation solid fraction and a first flotation liquid fraction. In a specific embodiment, the method further comprises a step of subjecting the manure to a coarse solid particles separation step to yield a coarse solid particles fraction and a first liquid fraction prior to the first biological passive flotation step and wherein the first liquid fraction is said part of said manure. In a more specific embodiment, the methods of the present invention further comprises subjecting the first flotation liquid fraction to a further solid-liquid separation step yielding a final liquid fraction. In an even more specific embodiment, the solid-liquid separation step is a second biological passive flotation step in a secondary flotation unit having a HRT of about 0.5 to about 4 hours to yield a final liquid fraction. In more specific embodiments, the first flotation step has a HRT of at least about 5.5 hours.

According to another specific embodiment, the coarse solid particles separation step is a decantation step or a screening step. According to another specific embodiment, the polymer is a polyacrylamide polymer.

According to another aspect of the present invention, there is provided an apparatus for treating manure comprising a main flotation unit having a hydraulic residency time (HRT) of about 4 to about 24 hours, said main flotation units including skimming means for removing floating solids from at least a portion of the surface of the manure and dredging means for removing settled contaminants from at least a portion of the bottom of the tank, whereby at least a part of said manure is directed to the main flotation unit wherein it is separated in a first floating solids fraction, a second liquid fraction and a second settled solids fraction and wherein the second liquid fraction has a SS content of about 3 g/L or lower.

In a more specific embodiment, there is provided an apparatus for treating manure comprising a coarse solid particles separation means, a main flotation unit having a HRT of about 4 to about 24 hours and a secondary flotation unit having a HRT of about 0.5 to about 4 hours, said main and secondary flotation units including skimming means for removing floating solids from at least a portion of the surface of the manure, dredging means for removing settled contaminants from at least a portion of the bottom of the tank, whereby the manure is directed to the coarse solid particles separation means wherein it is separated in a first liquid fraction and a first settled solids fraction, the first liquid fraction is then directed to the main flotation unit wherein it is separated in a first floating solids fraction, a second liquid fraction and a second settled solids fraction, the second liquid fraction is then directed to the secondary flotation unit wherein it is separated in a second floating solids fraction, a third liquid fraction and third settled solids fraction, whereby settled solids fractions and floating solids fractions are skimmed and dredged away, respectively, from the liquid fractions and wherein the third liquid fraction has a suspended solid content of about 3 g/L or lower. In a more specific embodiment, the coarse solid particles separation means is a decantation tank. In a further more specific embodiment, the main flotation unit has a HRT of at least about 5.5 hours. Note that according to alternate embodiments, the secondary flotation unit can be replaced by a tank for conducting an other solid-liquid separation step inclusing a decantation.

As used herein, the term "manure" is meant to refer herein to animal wastes including animal dejections, feed remains and hair including but not limited to swine, and cattle manure. According to more specific embodiments, this term refers to pig manure.

As used herein, the term "biological passive flotation" is meant to refer herein to flotation which uses for its operation solely gas produced by microorganisms present in manure without concentrating or compressing It, without being assisted by outside sources of gases.

As used herein, the terms "soils saturated in phosphorus" is meant to refer herein to a soil having a content in phosphorus that is so high that any significant increase in this content from untreated manure would be, in the view of an agronomist detrimental to the soil and the environment.

As used herein, the term "dredging means" is meant to refer herein to means able to remove solids settled from the bottom of a tank. Without limiting the generality of this definition, it includes bottom scrapers, pumps, screw conveyor etc.

As used herein, the term "skimming means" is meant to refer herein to means able to remove floating solids. Without limiting the generality of this definition, It includes surface scrapers, skimmers, etc.

As used herein, the term "polymer" is meant to refer herein to any agent able flocculate suspended matters. Hence, without limiting the generality of the above definition, any polymer used in flotation or dewatering of wastewater treatment including polyacrylamide polymers positively or negatively charged may be used in accordance with the present invention. The optimal polymer for treatment of a particular manure is selected according to its efficiency as determined experimentally with the particular manure.

As used herein, the terms "coarse solid particles" are meant to refer herein to the larger solid particles such as animal hair, food remains, etc. Without limiting the generality of this definition, it includes solid particles of a size equal to or larger than about 0.1 mm.

Other objects, advantages and features of the present invention will become more apparent upon reading of the following non-restrictive description of preferred embodiments thereof, given by way of example only with reference to the accompanying drawing.

DETAILED DESCRIPTION OF THE SPECIFIC EMBODIMENTS

The present invention concerns a method for treating animal manure by biological passive flotation made possible by gases ($CO_2$, $H_2S$, $NH_3$, etc.) produced by microorganisms In the manure in amounts sufficient to enable the flocs to rise to the surface.

A specific embodiment of the present invention comprises three principal steps that may easily be operated in batch, semi-continuous or continuous mode: 1) a first rapid decantation enabling a separation of easily settleable solids (hair, used mash bark, etc.); 2) a biological passive flotation of the manure with simultaneous decantation of the solids conducted with a prior addition of organic polymer (flocculating and/or coagulating agent); 3) a second passive biological flotation with simultaneous decantation in the same tank with a prior addition of organic polymer (flocculating agent).

Figure 1:
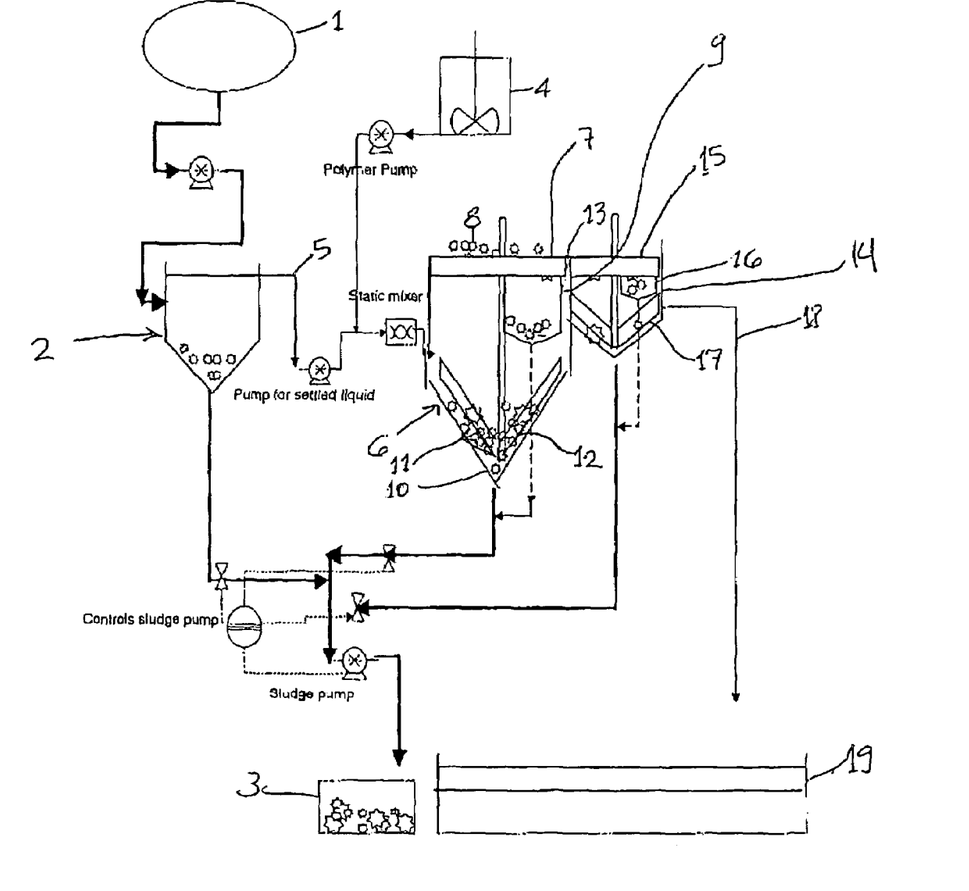
FIG. 1 schematically illustrates the steps of the method of the present invention according to a specific embodiment.

As is illustrated in FIG. 1, the manure is directed from the temporary manure storage (1) to the first decantation tank (2). They are then settled without polymers (although polymers may be added) and for a hydraulic retention time (HRT) of 0.25 to 2 hours enabling a removal of easily settleable solids. These solids are then extracted from the bottom of the first decantation tank (2) and directed towards the solid reservoir (3). The initial content of total solids in the manure is preferably between 5 and 70 g/L. An appropriate amount as determined by prior optimization tests of polymers (flocculents) (4) Is added to the effluent liquid (6) of the first decantation tank (2) before it is introduced, by gravity or pumping for instance, in a main flotation unit (6) characterized by a HRT of between about 4 and about 24 hours. In the main flotation unit (6), the manure produces gazes ($CO_2$, $H_2S$, $NH_3$, etc.) in amounts sufficient to enable the flocs to rise to the surface. Mechanical skimming means (7) then skim away the floating solids (8) and directs them to a recovery cone (9). An other fraction of the solids (11)

settles to the bottom (10) of the main flotation unit (6), which is preferably equipped with bottom dredging means (12) for removing settled solids from the bottom of the tank. In the third phase, the liquid (13) coming out of the main flotation unit (6), by pumping or gravity for instance, is directed to a secondary flotation unit (14) having a HRT preferably between about 0.5 and 4 h. A polymer (flocculent) may then be added if desirable as may be determined by routine experimentation (not shown) in the intake port (not shown) of the secondary flotation unit also equipped with skimming means (17). The solids recovered by these skimming means are then preferably directed to the same solid reservoir (3) as the solids so recovered in the two first phases. Suspended solids (SS), COD and total phosphorus ($P_t$) removals of between 70% and 90% are generally obtained in methods according to an embodiment of the present invention comprising the three above-described phases. The system effluent (18) presents a ratio $NH_4/P_t>7$, making possible its use as irrigation water in soils saturated in phosphorus. This effluent (18) can advantageously be stored in manure pit (19) so as to be usable as irrigation water. This effluent (18) is also much less odorant than raw manure (1) and can be land spread using conventional land spreading equipment. The mixture of solids yielded after each phase possesses a dry solid content of about 7 to 17%, with an average value of 10 to 12%. These solids may be stored in an appropriate tank (3) and be used for composting on the farm or transported to a composting unit in a vacuum truck. Finally, these solids may also be mixed with cellulosic matters (e.g. wood chips and sawdust) and be used for direct land spreading.

EXAMPLE 1

Treatment of Farrowing Unit Manure Operated in Batch Operation with a HRT of 12 Hours Farrowing unit manure was screened to remove all coarse materials, and 3.8 L of a 1 g/L solution of Percol 7557™ polymer was mixed with 19.2 L of screened manure. Table 1 below presents results obtained after 12 hours of decantation. Operating the flotation unit of 23 L in a batch mode permitted to reduce the HRT of the manure to about 12 hours while satisfying the performance criteria ($N-NH_4/P_t>7$). A reduction of SS of 85.5% and of phosphorus total ($P_t$) of 58.9% were reached. The ratio $N-NH_4/P_t$ reached 8.5.

TABLE 1

Farrowing unit manure separation in a flotation unit of 23 L operated in batch with a HRT of 12 hours

|  | SS (g/L) | COD (mg/L) | TKN (mg/L) | $N-NH_4^+$ (mg/L) | $P_t$ (mg/L) | $P-PO_4^{3-}$ (mg/L) | $N-NH_4^+/P_t$ |
|---|---|---|---|---|---|---|---|
| Untreated | 8.50 | 18050 | 2330 | 1860 | 522 | 390 | 3.6 |
| Treated | 1.23 | 8600 | 1820 | 1780 | 215 | 193 | 8.5 |
| Removal (%) | 85.5 | 46.4 | 22.0 | 4.2 | 58.9 | 50.6 |  |

EXAMPLE 2

Treatment of Farrowing Unit Manure Operated in a Continuous Mode with a HRT of 4.6 Hours The manure having a total solid concentration of 1.7% was screened to 3 mm in a flotation unit of 23 L. The manure flow rate was of 70 mL/min while the Percol 7557™ polymer solution (1 g/L) flow rate was set at 14 mL/min, namely 16.7% (v/v) of the total volume to obtain a HRT of 4.6 hours. Removal yields are presented in Table 2 below. A reduction of SS of 87.8% and of $P_t$ of 59.8% resulting in an increase $N-NH_4/P_t$ to 8.1 were obtained thereby satisfying the performance criteria targeted namely a $N-NH_4/P_t>7$.

TABLE 2

Farrowing unit manure (1.7% TS) separation in a flotation unit of 23 L operated in a continous mode with an HRT of 4.6 hours

|  | SS (g/L) | DCO (mg/L) | TKN (mg/L) | $N-NH_4^+$ (mg/L) | $P_t$ (mg/L) | $P-PO_4^{3-}$ (mg/L) | $N-NH_4^+/P_t$ |
|---|---|---|---|---|---|---|---|
| Untreated | 10.1 | 16050 | 2330 | 1860 | 522 | 390 | 3.6 |
| Treated | 1.24 | 8125 | 1770 | 1430 | 210 | 155 | 8.1 |
| Removal (%) | 87.8 | 49.4 | 24.0 | 23.2 | 59.8 | 60.3 |  |

EXAMPLE 3

Treatment of Pig Nursery Manure Operated in a Continuous Mode with an HRT of 6.4 Hours The manure was screened to 3 mm in a flotation unit of 23 L. The manure flow rate was set at 50 mL/min while the Percol 7557™ polymer solution (1 g/L) flow rate was set at 10 mL/min, namely 16.7% (v/v) of the total volume, to obtain a HRT of 6.4 hours. Removal yields are presented in Table 3 below. A reduction of SS of 95.4%, of $P_t$ of 77.3% and of COD of 68.5% were achieved and the ratio $N-NH_4/P_t$ reached 10 thereby satisfying the targeted performance criteria.

TABLE 3

Pig nursery manure (6.5% TS) separation in a flotation unit of 23 L operated in a continous mode with an HRT of 6.4 hours

|  | SS (g/L) | COD (mg/L) | TKN (mg/L) | $N\text{—}NH_4^+$ (mg/L) | $P_t$ (mg/L) | $P\text{—}PO_4^{3-}$ (mg/L) | $N\text{—}NH_4^+/P_t$ |
|---|---|---|---|---|---|---|---|
| Untreated | 45.5 | 91500 | 4320 | 3640 | 1397 | 327 | 2.6 |
| Treated | 2.1 | 28850 | 3180 | 3170 | 317 | 289 | 10.0 |
| Removal (%) | 95.4 | 68.5 | 26.4 | 13.0 | 77.3 | 11.6 | |

The following examples were performed in a flotation unit of 315 L.

EXAMPLE 4

Treatment of Farrowing Unit Manure Operated in Continuous Mode with an HRT of 11 Hours The manure was first settled (1 hour) and then screened to 3 mm to remove the coarse matters. The manure flow rate was of 397 mL/min while the LPM 9511™ polymer solution (1 g/L) flow rate was set at 80 mL/min, namely 16.7% (v/v) of the total volume to obtain a HRT of 11 hours. Removal yields are presented in Table 4 below. A reduction of SS of 95.4%, of $P_t$ of 85.9% were achieved and the $N\text{—}NH_4/P_t$ ratio reached more than 14 thereby satisfying the performance criteria targeted.

was of 397 mL/min while the LPM 9511™ polymer solution (1 g/L) flow rate was set at 80 mL/min to obtain a HRT of 11 hours. Removal yields are presented in Table 5 below. A reduction of SS of 84.8%, and of $P_t$ of 31.5% were achieved. The gain on the $N\text{—}NH_4/P_t$ ratio was relatively small. This is explained by the nature of the manure yielded in the farrowing unit as compared to that yielded in the pig nursery. The latter has a high ammonia content as compared to its phosphorus content. It results in a relatively high $N\text{—}NH_4/P_t$ ratio (7.8) in the untreated manure. The main benefit of applying this method manure having such a high content in ammonia is the removal of SS and the consequent visual aspect improvement of the manure, and the reduction of odors.

TABLE 4

Farrowing unit manure (1.1–3.3% TS) separation in a flotation unit of 315 L operated in a continous mode with an HRT of 11 hours

|  | SS (g/L) | COD (mg/L) | TKN (mg/L) | $N\text{—}NH_4^+$ (mg/L) | $P_t$ (mg/L) | $P\text{—}PO_4^{3-}$ (mg/L) | $N\text{—}NH_4^+/P_t$ |
|---|---|---|---|---|---|---|---|
| Untreated | 26.1 | 22130 | 3190 | 1355 | 678 | 81.0 | 4.9 |
| Treated | 1.45 | 7450 | 1760 | 1320 | 95.7 | 74.7 | 14.0 |
| Removal (%) | 94.4 | 66.3 | 44.8 | 2.6 | 85.9 | 7.8 | |

TABLE 5

Pig nursery manure (2.6% TS) separation in a flotation unit of 315 L operated in a continous mode with an HRT of 11 hours

|  | SS (g/L) | COD (mg/L) | TKN (mg/L) | $N\text{—}NH_4^+$ (mg/L) | $P_t$ (mg/L) | $P\text{—}PO_4^{3-}$ (mg/L) | $N\text{—}NH_4^+/P_t$ |
|---|---|---|---|---|---|---|---|
| Untreated | 18.5 | 25050 | 2560 | 2160 | 335 | 185 | 7.8 |
| Treated | 2.8 | 24450 | 2000 | 1750 | 230 | 185 | 8.1 |
| Removal (%) | 84.8 | 2.4 | 21.7 | 19.2 | 31.5 | 0 | |

EXAMPLE 5

Treatment of Pig Nursery Manure Operated in a Continuous Mode with an HRT of 11 Hours The manure was first settled (1 hour) and then screened to 3 mm to remove the coarse matters. The manure flow rate

EXAMPLE 6

Treatment of Feeder Pig Manure Operated in a Continuous Mode with an HRT of 11 Hours The manure was first settled (1 hour) and then screened to 3 mm to remove the coarse matters. The method was conducted with feeder pig manure for a continuous HRT of 11 hours. The manure flow rate was of 397 mL/min while the LPM 9511™ polymer solution (1 g/L) flow rate was set at 80 mL/min to obtain a HRT of 11 hours. Removal yields are presented in Table 6 below. A reduction of SS of 96.5%, and of $P_t$ of 57% were achieved. Although the performance criteria for the N—$NH_4$/$P_t$ ratio is not reached, the effluent yielded by this treatment is even better for irrigation purposes than those yielded in previous examples because of its lower SS. It is submitted that this result is due to the very low solid content of the manure and its low $NH_4^+$ content (450 mg/L), comparatively to the ranges (1800–3600 mg/L) of the manure used in the other examples.

treatment significantly improved its visual aspect and significantly reduced the odors.

It is to be noted that the manure used in this Example differed significantly in its content from that used in Example 6. It originates from the same farm but was obtained on a different date. Hence, the N—$NH_4$/$P_t$ ratio average of the untreated manure was of 10.9, while that used in Example 6 above was of 2.5. This shows that the manure content varies significantly depending on the date on which it is obtained.

TABLE 6

Feeder pig manure (1.3% TS) separation in a flotation unit of 315 L operated in a continous mode with an HRT of 11 hours

|  | SS (g/L) | COD (mg/L) | TKN (mg/L) | N—$NH_4^+$ (mg/L) | $P_t$ (mg/L) | P—$PO_4^{3-}$ (mg/L) | N—$NH_4^+$/$P_t$ |
|---|---|---|---|---|---|---|---|
| Untreated | 10.9 | 15370 | 750 | 450 | 214 | 114 | 2.5 |
| Treated | 0.38 | 2450 | 450 | 405 | 92.3 | 94 | 4.5 |
| Removal (%) | 96.5 | 84.1 | 40.0 | 10.0 | 67.0 | 17.5 |  |

TABLE 7

Feeder pig manure (2.8% TS) separation in a flotation unit of 315 L operated in a continous mode with an HRT of 5.5 hours, following by a decantation of 30 minutes

|  | SS (g/L) | COD (mg/L) | TKN (mg/L) | N—$NH_4^+$ (mg/L) | $P_t$ (mg/L) | P—$PO_4^{3-}$ (mg/L) | N—$NH_4^+$/$P_t$ |
|---|---|---|---|---|---|---|---|
| Untreated | 20.4 | n.d. | 2510 | 2170 | 320 | 92.3 | 10.9 |
| Treated | 0.92 | n.d. | 1920 | 1340 | 65 | 65 | 20.7 |
| Removal (%) | 95.5 | n.d. | 23.6 | 38.2 | 79.7 | 29.5 |  | n.d.: non disponible

EXAMPLE 7

Treatment of Feeder Pig Manure Operated in a Continuous Mode with an HRT of 5.5 Hours The method was conducted with feeder pig manure for a continuous HRT of 5.5 hours. The manure flow rate was set to 794 mL/min, while the LPM 9511™ polymer solution (1 g/L) flow rate was set at 160 mL/min to obtain a HRT of 5.5 hours. The flotation unit effluent was settled for 30 minutes with an additional quantity of polymer (1 g/L) amounting to about 16.7% of the volume of the combined polymer and effluent. Removal yields are presented In Table 7 below. The N—$NH_4$/$P_t$ ratio reached was of 20.7 and the SS removal reached 95.5%. Although the treatment was not necessary to reach the performance norms because the N—$NH_4$/$P_t$ ratio of the untreated manure already satisfied them (10.9), the

EXAMPLE 8

Treatment of Feeder Pig Manure Operated in a Continuous Mode with an HRT of 8 Hours The manure was first decanted (1 hr) then screened to 3 mm, treated In a first flotation unit, and a second flotation unit. The manure flow rate was 550 mL/min while the LPM 9511™ polymer solution (1 g/L) flow rate was set at 110 mL/min to obtain a HRT of 8 hours. 200 mL/min of solids is drawn from the bottom of main flotation unit resulting in an effluent flow rate of 466 mL/min. This 466 mL/min is mixed with an amount of 66 mL/min of the LPM 9511™ polymer before it entered the secondary flotation unit. Removal yields are presented in Table 8 below. A reduction of SS of 97.2%, of $P_t$ of 75.3% and of 51.0% COD were achieved. The N—$NH_4$/$P_t$ ratio reached 32.2 thereby enabling its use for land spreading on soil overloaded with phosphorus without significantly increasing the problem.

This treatment also significantly improved the manure's visual aspect and substantially reduced its odors because of its low SS content.

produced optimal results. The dryness of the separated and recomposed solids produced in the Examples presented herein varied between 7 and 17%.

TABLE 8

Feeder pig manure (3.0% TS) separation in a flotation unit of 315 L operated in a continous mode with an HRT of 8 hours, following by a separation in a secondary flotation unit of 70 L with an HRT of 1.6 hours

|  | SS (g/L) | COD (mg/L) | TKN (mg/L) | $N-NH_4^+$ (mg/L) | $P_t$ (mg/L) | $P-PO_4^{3-}$ (mg/L) | $N-NH_4^+/P_t$ |
|---|---|---|---|---|---|---|---|
| Untreated | 14.9 | 38900 | 2370 | 2260 | 284 | 87.0 | 3.8 |
| Treated | 0.42 | 19000 | 2110 | 2260 | 70.1 | 87.0 | 32.2 |
| Removal (%) | 97.2 | 51.0 | 10.9 | 0.0 | 75.3 | 0.0 | |

Solid Fraction of Separated Solid

The characteristics of the solid fractions yielded in each of the examples presented above are presented in Table 9 below. The settled solids used for the tests performed in the 23 L flotation unit were not characterized because the Although the present invention has been described hereinabove by way of preferred embodiments thereof, it can be modified, without departing from the spirit and nature of the subject invention as defined in the appended claims.

TABLE 9

CHARACTERISTICS OF THE SOLID FRACTIONS YIELDED IN ABOVE EXAMPLES 1 TO 8

| Example No. | Manure type Operating mode HRT | Fraction | Proportion (% dry weight (d.w.)) | Total solids (%) | TKN (% d.w.) | $N-NH_4^+$ (% d.w.) | $P_t$ (% d.w.) | $P-PO_4^+$ (% d.w.) |
|---|---|---|---|---|---|---|---|---|
| 1 | Farrowing unit Curvée. 12 h | Total | 100 | 9.3 | 9.06 | 3.16 | 4.93 | 4.03 |
| 2 | Farrowing unit Continuous, 4.6 h | Total | 100 | 9.3 | 8.03 | 2.67 | 3.44 | 3.01 |
| 3 | Pig nursery Continuous, 6.4 h | Total | 100 | 13.0 | 5.96 | 2.51 | 2.39 | 0.77 |
| 4 | Farrowing unit Continuous, 11 h | Decantation | 62.5 | 12.8 | 1.71 | 1.58 | 2.22 | 0.36 |
|  |  | Main flotation | 37.5 | 10.2 | 4.25 | 1.76 | 2.79 | 0.52 |
|  |  | Recomposed mixture |  | 11.8 | 2.66 | 1.65 | 2.43 | 0.42 |
| 5 | Pig nursery Continuous, 11 h | Decantation | 11.6 | 15.8 | 2.20 | 1.65 | 1.02 | 0.51 |
|  |  | Main flotation | 88.4 | 7.5 | 5.55 | 2.76 | 2.11 | 0.93 |
|  |  | Recomposed mixture |  | 8.6 | 5.16 | 2.63 | 1.98 | 0.88 |
| 6 | Feeder pig Continuous, 11 h | Decantation | 83.6 | 17.1 | 1.04 | 0.45 | 0.84 | 0.34 |
|  |  | Main flotation | 16.4 | 16.0 | 5.69 | 0.58 | 1.40 | 0.34 |
|  |  | Recomposed mixture |  | 16.9 | 1.80 | 0.47 | 0.93 | 0.34 |
| 7 | Feeder pig Continuous, 5.5 h | Decantation | 38.0 | 15.9 | 1.92 | 1.55 | 0.70 | 0.27 |
|  |  | Main flotation | 62.0 | 4.5 | 11.9 | 4.67 | 4.44 | 1.20 |
|  |  | Recomposed mixture |  | 7.3 | 8.1 | 3.17 | 2.87 | 0.73 |
| 8 | Feeder pig Continuous, 8 h | Decantation | 43.3 | 17.8 | 2.34 | 3.60 | n.a. | n.a. |
|  |  | Main flotation | 24.9 | 6.1 | 11.3 | 6.20 | 2.86 | 1.45 |
|  |  | Secondary flotation | 31.8 | 7.6 | 8.72 | 5.04 | 1.92 | n.a. |
|  |  | Recomposed mixture |  | 12.1 | 8.36 | 7.29 |  |  | manure was screened at 3 mm in the farm and the screen overflow was not quantified. This table demonstrates a variability in the characteristic of the solids after treatment. This variability may be function of the following parameters: the settled solids during the first decantation for the separation in the 315 L flotation unit had a lower content in nitrogen and phosphorus because they are constituted in large part of cereal peels and of hair, in a lesser proportion; the dryness of the first decantation's solids Is much higher; the proportion of the solid fraction yielded by the treatment as compared to the total treated manure volume is of 26.7%, 19.6%. 12.4%, 36.2% and of 42.9% for Examples 4 to 8, respectively. Although using HRTs of 5.5 and 8 produces satisfactory results, tests performed with an HRT of 11 hours

REFERENCES

Beaudet, R., Gagnon, C., Bisaillon, J. G. and Ishaque, M. (1990). Microbiological aspects of aerobic thermophilic treatment of swine wastes. *Appl. Environ. Microbiol.*, 56: 971–976.

Beaudet, R., Bisaillon, J. G., Ishaque, M. and Sylvestre, M. (1987). Traitement microbiologique du lisier de porc à l'aide de réacteurs àfilms fixes. For the ministére de l'Environnement du Québec, report no. RD-87-05, Envirodoq 87009, 55 p.

Berthiaume, C. (Fertior, Coopérative de fertilisation organique) (1996). Forum sur le traitement des lisiers en Chaudière-Apalaches: Dans un contexte de développement durable et de cohabitation harmonieuse des usages du territoire. Conference proceedings.

Bilstad, T., Madland, M., Espedal, E. and Hanssen, P. H. (1992). Membrane separation of raw and anaerobically digested pig manure. Water Sci. Technol., 25(10): 19–26.

Bisaillon, J. G., Beaudet, R., Sylvestre, M., Ishaque, M., Morin, A., Di Franco, E. and Guérin, A. M. (1984). Aspects microbiologiques du lisier de porc. Sci. Tech. Eau. 17(4): 397–400.

Bordeleau, L. M. (1993). L'épuration des eaux usées par la rhizosphère (champs de roseaux) en région nordique. Final report for the ministère de l'Environnement du Québec. Executed by KWS Phragmitech Inc. at Hotel La Pineraie, Lac Simon, Chénéville (Qué.).

Bourque. D., Bisaillon, J. G., Beaudet, R., Sylvestre, M., Ishaque, M. and Moran, A. (1987). Microbiological Degradation of Malodorous Substances of Swine Waste under Aerobic Conditions. Appl. Environ. Microbiol., 53(1): 137–141.

Brooks, J. L. Rock, C. A. and Struchtemeyer, R. A. (1984). Use of peat for on-site waste-water treatment: Field studies. J. Environ. Qual., 13(4): 524–530.

Bureau de la statistique du Québec, (1987). Statistiques économiques porcs (July 1987).

Bureau de normalisation du Québec, Ministère de l'industrie, du Commerce et du Tourisme, (1974). Canadian National Norms—Amendements organiques—compost. BNQ 0413-200/1996-01-15.

Canizares, R. O. and Dominguez, A. R. (1993). Growth of *Spirulina maxima* on swine waste. Bioresource Technol., 45: 73–75.

Cayer, R. (Fenco Lavalin inc.) (1989). Orientations futures de l'usine expérimentale de traitement aérobie du lisier de porc de St-Elzéar de Beauce. Study report presented to Environnement Québec (Dir. Assainissement agricole), projet no. 56328.

Chudacek, M. W, Marshall, S. H. and Warman C. H. (1994). Method and apparatus for separation by flotation. U.S. Pat. No. 5,660,718.

Cloutier, L. (1996). Projet: exporter le lisier, en engrais sans odeur. La Presse, Wednesday 6 Nov. 1996, Montreal.

Cooney, C. L., Rha, C. and Tannenbaum, S. R. (1980). Single-cell protein: engineering, economics and utilization in foods. Acv. Food Res., 26: 1–52.

Cooper, P. F. and Findlater, B. C. (1990). Constructed wetlands in water pollution control. Advances in Water Pollution Control IAWPRC. Pergamon Press, London, 605 p.

Couillard, D. (1986). Traitements primaires des eaux usées. EAU-7243.2, INRS-Eau, Universitédu Québec.

Couillard, D. (1990). Le traitement des lisiers de porcs excédentaires. COURANTS, n° July–August, pp. 40–48.

Coyne, T. J. (1996). Wastewater treatment system and method. U.S. Pat. No. 5,540,836.

De La Noüe, J., Sevrin-Rayssac, J. S., Mriojouls, C., Marcel, J., and Sylvestre. S. (1994). Biotreatment of swine manure by intensive lagooning during winter. Bioresource Technol., 50: 213–219.

Degrémont (1979). Water Treatment Handbook. Degrémont Company, 5th Edition, Rueil-Malmaison: 1186 p.

Direction des études économiques (1986). L'industrie Porcine—Working paper. MAPAQ, September 1986.

Environnement Canada (1984). Un compost à base de lisier de porcs. Ministère des Approvisionnements et Services et Environnement Canada. EN-40-321/1984. 12 pp.

Farnham, R. S. and Brown, J. L. (1972). Advanced wastewater treatment using organic and inorganic materials. Part I: Use of peat and peat-sand filtration media. Proceeding, 4th Internationnal Peat Congress, Helsinki, Finland, 4: 271–286.

Fernandes, L. and McKyes, E. (1991). Theoretical and experimental study of a sequential batch reactor treatment of liquid swine manure. Am. Soc. Agric. Engineers, 34(2): 597–602.

Fernandes, L., McKyes, E., Warith, M. and Barrington, S. (1991). Treatment of liquid swine manure in the sequencing batch reactor under aerobic and anoxic conditions. Can. Agric. Eng., 33: 373–379.

FPPQ (2001). Rapport d'évaluation des techniques de gestion et de traitement du lisier de porc, Fédération des producteurs de porcs du Québec. Préparépar le groupe de travail <<Transfert technologique>> du Plan agroenvironnemental de la production porcine.

Ganbazo, G. (1991). Effet des événements hydrologiques sur les pertes d'azote et de phosphore suite à l'épandage de lisier de porc. Thèse de Doctorat er Sciences (Eau). INRS-Eau, Universitédu Québec, 293 p.

Gariépy, S. (1987). Production de protéines alimentaires par procédébactérien aérobie thermophile: étude de cas d'un effluent d'abattoir. Masters thesis, INRS-Eau (t-97), 270 p.

Gariépy, S., Vallée, P., Emond, C. and Azzopardi, J. P. (1989). Étude pilote d'un système de gestion du lisier de porc par séparation solide-liquide, traitement aérobie et irrigation. 12° Symp. int. sur le traitement des eaux usées, 20–21 November, Montreal.

Grady, D. L. Jr and Lim, H. C. (1980). Biological Wastewater Treatment. Marcel Dekker, New York, pp. 433–499.

Green, J. M. and Kramer, A. (1979). Food Processing Waste Management. AVI publ. West Port, 629 p.

Grisé, M. (2000) Waste treatment. U.S. Pat. No. 6,033,570.

Hayashida, S., Cjoi, M. Y., Nanri, N. and Miyaguchi, M. (1988). Production of potato common scap antagonistic biofertilizer from swine feces with *Streptomyces albidoflavus*. Agric. Biol. Chem., 52: 2397–2402.

Hoffland, R. O. and Austin, J. (2000). Apparatus and methods for wastewater treatment from high volume livestock production. U.S. Pat. No. 6,054,044.

IAF (Institut Armant-Frappier) (1985). Programme d'aide à la recherche et au développement sur le traitement du fumier. Développement sur le traitement microbiologique du lisier de porc. Présentéà la Direction de la recherche et à la Direction de l'assainissement agricole du ministère de l'Environnement du Québec (#Envirodoq 850681).

Itoh, U. (1987). Sewage treatment process. U.S. Pat. No. 4.671.881.

Jackson, M. L. (1980). Continuous fermentation process and apparatus. U.S. Pat. No. 4,069,149.

Jenkins, D., Richard, M. G. and Daigger, G. T. (1993). Manual on the causes and control of activated sludge bulking and foaming. 2ᵉ Édition, Lewis Publishers, Inc., Chelsea, United-States, 193 p.

Jolicoeur, P. and Morin, A. (1987). Isolation of *Acinetobacter calcoaceticus* strains degrading the volatile fatty acids of swine wastes. Biol. Wastes, 19: 133–140.

Kolber, S. N. (2001) Treatment of waste produced by farm animals raised under confined conditions. U.S. Pat. No. 6,190,566.

Lacombe, R. (1996). Les producteurs de procs tentent d'oublier leurs rivalités pour former un front: Le colloque de la filiére porcine doit servir de catalyseur. Le Soleil, 19 Nov. 1996.

Legros, R. Chaouki, J., Bi X. T., Macchi, Arturo, Ratnani, K. (1998). Spout-fluid bed dryer and granulator for the treatment of animal manure. U.S. Pat. No. 5,809,664.

Lo, K. V., Llao, P. h. and Van Kleeck, R. J. (1990). A full-scale sequencing batch reactor treatment of dilute swine wastewater, Can. Agric. Eng., 33: 193–195.

Maheux, B., Dumas, R., Marinier, B., Paquin, Y. and Savard, M. (1996). Valorisation du lisier de porc et des résidus des sciures de la MRC de la Mitis. UQAR, final report no. EE43-780-537-226. no. 22-873-257-01015, 48 pages (for Meunerie J. B. Dionne and Fils Mont-Joli, Agriculture and Agri-food Canada, Ministére de l'Environnement et de la Faune, Ministère de l'Agriculture, des Pêcheries et de l'Alimentation du Québec).

Mandi, L., Houhoum, B., Asmama, S. and Schwartzbrod, J. (1996). Wastewater treatment by reed beds, an experimental approach. Water Res., 30(9): 2009–2016.

MAPAQ (1986). L'industrie porcine—Document de travail. Direction des études économiques, September 1986.

Marr, A. G. (1968). Growth of microorganisms: general. Vans: Single-Cell Protein. Mateles, R. I. and S. R. Tannenbaum (Editeurs), M.I.T. Press, Cambridge, pp. 169–180.

Marx, R., Kohl, M. and Klein, J. (1990). Results of the improvement of liquid swine manure as a substrate for the biotechnological conversion process. Zbl. Mikrobiol., 145: 269–275.

Matsch, L. C. and Drnevich, R. F. (1977). Autothermal aerobic digestion. J. Water Pollut. Control Fed., 49(2): 296–310.

McElvaney J. D. (2001). Anaerobic digester system and method. U.S. Pat. No. 6,254,775.

Ménart. J. C. (1996). La valorisation de la biomasse (résidus organiques) par la technique de compostage In situ. Forum sur le traitement des lisiers en Chaudière-Appalaches: dans un contexte développement durable et de cohabitation harmonieuse des usages du territoire; FERTIOR (Coop de fertilisation organique), Conference proceedings, September 1996.

Miknevich, J. P. and Hassick, D. E. (1998). Separation of raw agricultural waste. U.S. Pat. No. 5,776,350.

Moo-Young, M. (1976). A survey of SCP production facilities. Proc. Biochem., 11(10): 32.

Mustin, M. (1987). Le compost: gestion de la matière organique, Francois Dubusc (Éditeur), Paris, 954 p.

Nadeau, J. B. (1996). Fumier, tu ne pueras pointl. L'ActualitéDecember 1996, pp. 42–50.

Osbourne, J. H. (1975). Tertiary treatment of campground wastes using a native Minnesota peat. J. Soil Water Conservation: 235–236.

Pabai, F., Kermasha, S. and Morin, A. (1996). Use of continuous culture to screen for lipase-producing microorganisms and interesterification of butter fat by lipase isolates. Can. J. Microbiol., 42: 446–551.

Rainville, N. and Morin, A. (1985). Change in the volatile fatty acids content of laboratory stored sterilized and non-sterilized swine wastew. Microbios, 42: 175–182.

Ramirez, E. R. and Johnson, D. L. (1980). Wastewater flotation. Canadian patent no. 1,091,830.

Roberge, G. (1992). Augmentation de l'efficacité de déphosphatation d'un filtre multi-média à base de tourbe par addition d'un agent dopant. Masters thesis, INRS-Eau, 164 p.

Roshanravan, M. (1995). Apparatus for dissolved gas flotation in anaerobic wastewater treatment. U.S. Pat. No. 5,437,785.

Sasaki, K., Tanaka, T., Nishizaqa, Y. and Hayashi, M. (1990). Production of a herbicide, 5-aminolevulinic acid, by *Rhodobacter sphaeroides* using the effluent of swine waste from an anaerobic digestor. Appl. Microbiol. Biotechnol., 32: 727–731.

Schwarting (2002). Schwarting Umwelt Gmbh, Installation de méthanisation pour déchets issus du secteur agricole. Promotional document. Website www.schwarting-umwelt.de.

Teran, A. J. Derrick, J. R. Jr., Samad, N. A., Willoughby, W. T., and Wood R. G. (2000). Apparatus and method for purification of agricultural animal waste. U.S. Pat. No. 6,039,874.

Tétrault, M. and Grandbois, D. (1999). Process and system for treatment of pig and swine manure for environmental enhancement. U.S. Pat. No. 5,885,461, Texier, C. (1996). Le traitement biologique du lisier de porc: procédés aérobies de nitrification-dénitrification et méthodes de compostage. Forum sur la traitement des lisiers en Chaudière-Appalaches. FERTIOR, Conference proceedings, September 1996.

Vallée, P., Gariépy, S., Emond, C. and Azopardi, J. P. (1989). Waste management system for a 2400-head swine operation: pilot-scale study. Summer joint congress 1989, SCGR-ASAE, 25–28 Jun. 1989. Quebec.

Van Bochove. E. (1993). L'étude du cycle de l'azote dans le processus de compostage: le cas du fumier de bovin. Masters thesis, INRS-Eau (t-160), 190 p.

Willson, G. B., Parr, J. F., Epstein, E., Marsh, P. B., Chaney, R. L., Colacicco, D., Burge, W. D., Sikora, L. J., Teste, C. F. and Hornick, S. (1980). Manuel for composting sewage sludge by the Beltsville aerated-pile method. Report EPA-600/8-80-022. U.S. Department of agriculture, Beltsville, Md. and Municipal Environmental Research Laboratory, E.P.A., Cincinnati, Ohio, U.S.A.

Yang, P. Y. and Cgen, H. (1994). A land-limited and energy saving treatment system for dilute swine waste-water. Bioresource Technol., 49: 129–137.

What is claimed is:

1. A method of treating animal manure yielding a final liquid fraction and solid fractions whereby the final liquid fraction has a suspended solids (SS) content of about 3 g/L or lower comprising subjecting at least a part of said manure to a first biological passive flotation step in a flotation unit having a hydraulic residency time (HRT) of about 4 to about 24 hours with a polymer to yield a first flotation solid fraction and a first flotation liquid fraction;

a further treatment step selected from the group consisting of subjecting said manure to a coarse solid particles separation step for removing solid particles larger than about 0.05 mm prior to the first floatation to yield a first liquid fraction wherein said first liquid fraction is said part of said manure, and subjecting the first flotation liquid fraction to a further solid-liquid separation step yielding a final liquid fraction.

2. A method as recited in claim 1, wherein the further treatment is subjecting said manure to a coarse solid particles separation step.

3. A method as recited in claim 1, wherein said further treatment is a solid-liquid separation step and said solid-liquid separation step is a second biological passive flotation.

4. A method as recited in claim 3, wherein the second biological passive flotation step is performed in a secondary flotation unit having a HRT of about 0.5 to about 4 hours.

5. A method of treating animal manure to yield a final liquid fraction and solid fractions comprising
- subjecting said manure to a coarse solid particles separation step to yield a coarse solid particles fraction and a first liquid fraction;
- subjecting said first liquid fraction to a first biological passive flotation step in a main flotation unit having a hydraulic residency time (HRT) of about 4 to about 24 hours with a polymer to yield a first flotation solid fraction and a first flotation liquid fraction;
- subjecting said first flotation liquid fraction to a solid-liquid separation step second biological passive flotation step in a secondary flotation unit having a hydraulic residency time of about 0.5 to about 4 hours to yield a second flotation solid fraction and a final liquid fraction,
- whereby said final liquid fraction has a suspended solids (SS) content of about 3 g/L or lower.

6. A method as recited in claim 5, wherein said first flotation step has a HRT of at least about 5.5 hours.

7. A method as recited in claim 6, wherein said first flotation step has a HRT of at least about 8 hours.

8. A method as recited in claim 5, wherein said coarse solid particles separation step is a decantation step.

9. A method as recited in claim 5, wherein the polymer is a polyacrylamide polymer.

10. A method as recited in claim 5, wherein said animal manure is pig manure.

11. A method as recited in claim 1, wherein said first flotation step has a HRT of at least about 5.5 hours.

12. A method as recited in claim 11, wherein said first flotation step has a HRT of at least about 8 hours.

13. A method as recited in claim 2, wherein said coarse solid particles separation step is a decantation step.

14. A method as recited in claim 1, wherein the polymer is a polyacrylamide polymer.

15. A method as recited in claim 1, wherein said animal manure is pig manure.

* * * * *